(12) United States Patent
Kitazawa (10) Patent No.: US 9,494,841 B2
(45) Date of Patent: Nov. 15, 2016

(54) REFLECTIVE COLOR DISPLAY

(71) Applicant: Toppan Printing Co., Ltd., Taito-ku (JP)

(72) Inventor: Kazushige Kitazawa, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 14 days.

(21) Appl. No.: 14/491,410

(22) Filed: Sep. 19, 2014

(65) Prior Publication Data

US 2015/0009552 A1    Jan. 8, 2015

Related U.S. Application Data

(63) Continuation of application No. PCT/JP2013/057887, filed on Mar. 19, 2013.

(30) Foreign Application Priority Data

Mar. 21, 2012   (JP) ................. 2012-064014

(51) Int. Cl.
| | | |
|---|---|---|
| *G02F 1/01* | (2006.01) | |
| *G02F 1/167* | (2006.01) | |
| *G02F 1/1335* | (2006.01) | |
| *G02B 5/20* | (2006.01) | |

(52) U.S. Cl.
CPC ............. *G02F 1/167* (2013.01); *G02B 5/201* (2013.01); *G02F 1/133514* (2013.01); *G02F 2203/02* (2013.01)

(58) Field of Classification Search
CPC .............. G02F 2203/02; G02F 1/133514; G02F 1/167; G02B 5/201
USPC ................. 359/296, 359, 885, 891; 345/107
See application file for complete search history.

(56) References Cited

U.S. PATENT DOCUMENTS

| | | | |
|---|---|---|---|
| 7,343,112 B2 | 3/2008 | Ito et al. | |
| 8,054,526 B2* | 11/2011 | Bouchard | G02B 5/201 |
| | | | 359/245 |
| 2013/0088769 A1 | 4/2013 | Fujishiro et al. | |

FOREIGN PATENT DOCUMENTS

| | | |
|---|---|---|
| JP | 2003-161964 | 6/2003 |
| JP | 2009-103886 | 5/2009 |
| JP | 2010-139863 | 6/2010 |
| TW | 201211632 A1 | 3/2012 |
| WO | 2011/155410 | 12/2011 |

OTHER PUBLICATIONS

U.S. Appl. No. 14/628,458, filed Feb. 23, 2015, Kitazawa, et al.
U.S. Appl. No. 14/678,726, filed Apr. 3, 2015, Kitazawa, et al.

(Continued)

*Primary Examiner* — Tuyen Tra
(74) *Attorney, Agent, or Firm* — Oblon, McClelland, Maier & Neustadt, L.L.P.

(57) ABSTRACT

An electrophoretic reflective color display has a color filter on an electrophoretic display layer displaying black and white. A colored portion and a non-colored portion are provided in a pixel of the color filter layer, and the colored portion has a hue defined by specified values of chromaticity coordinates (a*, b*), measured with transmitted light using a D65 light source, in a chromaticity diagram of the L*a*b* color system.

20 Claims, 2 Drawing Sheets

(56) References Cited

OTHER PUBLICATIONS

International Search Report issued Apr. 23, 2013, in Application No. PCT/JP2013/057887.
Extended European Search Report issued Oct. 23, 2015 in Patent Application No. 13764967.9.

Office Action issued Jul. 19, 2016, in Taiwan Patent Application No. 102109769, filed Mar. 20, 2013 (with English-language Translation).
"A Guide to Understanding Color Communication", X-Rite, Inc., 2007, 26 pages.

* cited by examiner

FIG. 3

REFLECTIVE COLOR DISPLAY

CROSS-REFERENCE TO RELATED APPLICATIONS

The present application is a continuation of International Application No. PCT/JP2013/057887, filed Mar. 19, 2013, which is based upon and claims the benefits of priority to Japanese Application No. 2012-064014, filed Mar. 21, 2012. The entire contents of these applications are incorporated herein by reference.

BACKGROUND OF THE INVENTION

Technical Field

The present invention relates to a reflective color display, and more particularly, to a reflective color display provided with an electrophoretic display layer.

Background Art

Recently, liquid crystal display panels using backlights have spread into the mainstream of image display panels. However, such a liquid crystal display panel using backlights is not necessarily suitable for an application, in which one continues to watch the screen over a long period of time, because of a great burden on eyes.

SUMMARY OF INVENTION

According to one aspect of the present invention, a reflective color display includes a substrate, an electrophoretic display layer formed on the substrate, a light transmissive electrode layer formed on the electrophoretic display, and a color filter layer formed on the light transmissive electrode layer and including one or more colored portions and a non-colored portion in a pixel located on the light transmissive electrode layer. The colored portion has at least one of a red hue, a green hue, a blue hue, or a yellow hue. The red hue is defined by a chromaticity coordinate $(a^*, b^*)$ in a chromaticity diagram of the $L^*a^*b^*$ color system satisfying $30 \leq a^* \leq 70$ and $-20 \leq b^* \leq 20$, the green hue is defined by the chromaticity coordinate satisfying $-70 \leq a^* \leq -30$ and $-20 \leq b^* \leq 20$, the blue hue is defined by the chromaticity coordinate satisfying $-20 \leq a^* \leq 20$ and $-70 \leq b^* \leq -30$, and the yellow hue is defined by the chromaticity coordinate satisfying $-20 \leq a^* \leq 20$ and $30 \leq b^* \leq 70$. The chromaticity coordinate is measured with transmitted light using a D65 light source.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
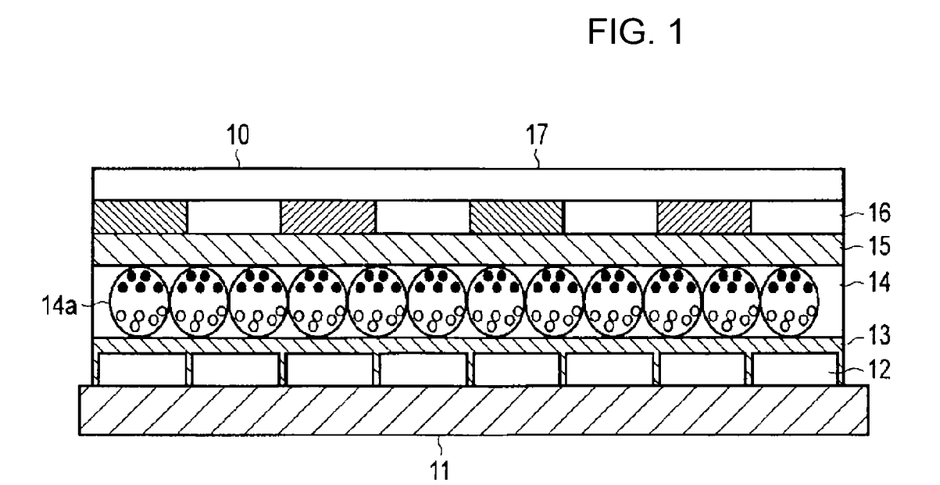
FIG. 1 is a cross-sectional view illustrating an example of an electrophoretic reflective color display related to an embodiment of the present invention.

FIG. 1 is a cross-sectional view illustrating an example of an electrophoretic reflective color display 10 related to an embodiment of the present invention.

The electrophoretic reflective color display 10 has a configuration including, on a substrate 11 provided with a pixel electrodes 12 of a given pattern on a surface thereof, an adhesive layer 13, an electrophoretic display layer 14, a transparent electrode layer (light-transmissive electrode layer) 15, an ink fixing layer (not shown), a color filter layer 16 and a protective film 17 stacked in this order. The color filter layer 16 includes pixels located on the ink fixing layer, the pixels each including a colored portion and a non-colored portion.

Specifically, in the electrophoretic reflective color display 10, the electrophoretic display layer 14 is formed on the substrate 11 via the adhesion layer 13.

The pixel electrodes 12 are connected to respective switching elements (not shown). In accordance with the operation of the switching elements, a positive or negative voltage can be applied between the pixel electrodes 12 and the transparent electrode layer 15.

The electrophoretic display layer 14 is formed by fixing microcapsules 14a to one another by means of a binder resin. The microcapsules 14a are each formed by sealing a dispersion medium which is obtained by dispersing an electrophoretic element in a dispersion liquid. The microcapsules 14a are each formed, for example, by dispersing, in a microcapsule shell, two types of particles having different electrical polarities in a transparent dispersion medium.

The two types of particles having different electrical polarities are, for example, black particles and white particles used in combination. The black particles used include, for example, inorganic pigments, such as inorganic carbon, fine powders such as of glass or a resin, or composite products of these materials. The white particles used include white inorganic pigments, such as known titanium oxide, silica, alumina and zinc oxide, organic compounds, such as a vinyl acetate emulsion, or composite products of these materials.

On the electrophoretic display layer 14, the transparent electrode layer 15, the ink fixing layer, the color filter layer 16 and the protective film 17 are successively stacked.

The color filter layer 16 is provided in the form of pixels each including a colored portion (colored layer) (one or two colors) and a non-colored portion. The colored and non-colored portions are formed so as to be in conformity with the pattern of the pixel electrodes 12.

Similar to a color filter used for a liquid crystal display device, the color filter layer 16 may be formed by subjecting a colored resist film to photolithography. As in the present embodiment, the color filter used for the electrophoretic reflective display may be formed by forming a receptive layer, followed by coating a plurality of inks on the receptive layer. The receptive layer is formed by coating of a coating solution for receptive layer formation that contains a resin.

The materials used for the receptive layer may include urethane resins, polyesters, acrylic resins and vinyl alcohol resins. The receptive layer may contain a porous material such as of synthetic silica or alumina in order to enhance absorbency of the solvents of inks. In the case where a sheet processing is performed, for example, the receptive layer is formed by screen printing, offset printing, spin coating, or intermittent coating using a die. In the case where a continuous processing is performed from roll to roll, for example, the receptive layer is formed using a general-purpose coating technique, such as die coating, comma coating, curtain coating or gravure coating. The receptive layer forming coating solution after coating is dried such as, for example, by heating or blowing air.

The method of coating an ink onto the receptive layer of the color filter layer 16 related to the present embodiment does not include forming a black matrix for partitioning pixels, and therefore coating is done in different colors. Thus, screen printing, offset printing, ink jet printing or the like may be used. Of these ink coating methods, ink jet printing, which enables easy position adjustment and ensures high productivity, is preferably used to eject an ink against the receptive layer to thereby form a color filter.

Ink jet printing is classified into a piezo-conversion system and a thermal-conversion system depending on the manner of ink ejection, of which an apparatus of the piezo-conversion system is preferably used. An ink jet apparatus should favorably have an ink atomization frequency of about 5 to 100 kHz and a nozzle diameter of about 5 to 80 μm. The ink jet apparatus is preferably one that has a plurality of heads arranged therein, with approximately 60 to 500 nozzles being assembled in one head.

The operation principle of the electrophoretic reflective color display 10 shown in FIG. 1 is described below.

Upon application of a voltage to the pixel electrodes 12, the electric field imposed on the microcapsules 14a of the electrophoretic display layer 14 moves. When the pixel electrodes 12 are positive, negatively charged particles in the microcapsules 14a move toward the pixel electrodes 12, while positively charged particles move toward the transparent electrode layer 15. Similarly, when the pixel electrodes 12 are negative, positively charged particles in the microcapsules 14a move toward the pixel electrodes 12, while negatively charged particles move toward the transparent electrode layer 15.

For example, when black particles are positively charged, white particles are negatively charged, and when the pixel electrodes 12 are negative, the black particles move toward the pixel electrodes 12 and the white particles move toward the transparent electrode layer 15 as shown in FIG. 1. In this case, all the light rays are reflected at the microcapsule layer in which the white particles are present in the surface thereof, and thus an observer is able to observe the light that has transmitted through the color filter layer 16.

Figure 2:
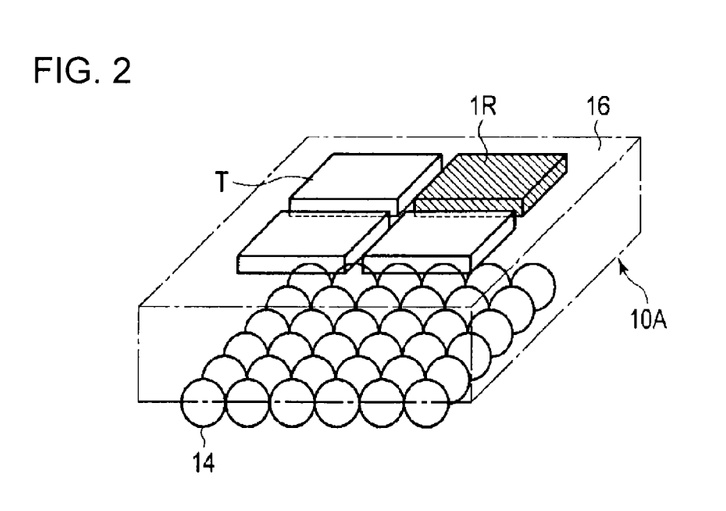
FIG. 2 is a perspective view illustrating an example of the state of color display in an electrophoretic reflective color display related to an embodiment of the invention.

FIG. 2 is a perspective view illustrating an example of an electrophoretic reflective color display 10A related to an embodiment of the present invention which is based on the operation principle described above. An electrophoretic reflective color display 10A includes an electrophoretic display layer 14 for black-and-white display which is provided thereon with pixels each including, for example, a colored portion 1R having a red hue and a non-colored portion (transparent portion) T. It should be noted that, in the example shown in FIG. 2, the colored and non-colored portions in each pixel are isotropically divided into four subpixels and rectangularly arrayed.

In the electrophoretic reflective color display 10A shown in FIG. 2, if all the portions corresponding to one pixel of the electrophoretic display layer 14 are for white display, or if a portion corresponding to the colored portion 1R alone of the electrophoretic display layer 14 is for white display, the resulting color is one which is formed by mixing the hue of the colored portion 1R and a white color of the non-colored portion T, or by mixing the hue of the colored portion 1R and a black color of the non-colored portion T. Accordingly, a color that is similar to the hue of the colored portion 1R is displayed. If a portion corresponding to the colored portion 1R alone of the electrophoretic display layer 14 is displayed as black, only the light that has transmitted through the non-colored portion T is reflected, thus resulting in white display. If all the portions corresponding to one pixel of the electrophoretic display layer 14 are displayed as black, no light in the pixel is reflected to provide black display. In this way, three-color display is obtained.

In this case, the hue of the colored portion 1R is preferably a red hue defined such that chromaticity coordinates (a*, b*), measured with transmitted light using D65 light source, in a chromaticity diagram of the L*a*b* color system satisfies the expressions of "30≤a*≤70" and "−20≤b*≤20".

① If the red hue is not within the above range, e.g. "a*≤30", and ② if all the portions corresponding to one pixel of the electrophoretic display layer 14 are displayed as white or ③ if a portion corresponding to the colored-portion 1R alone of the electrophoretic display layer 14 is displayed as white, vividness during color display lowers and thus a contrast (shading ratio) between black/white display and color display (red) is not ensured. On the other hand, if "a*≥70", the brightness in color display is not sufficient and thus a good contrast (bright-dark ratio) between black display and color display (red) is not obtained.

Similarly, in the case where the colored portion has green, blue and yellow hues as well, the hues of the respective colored portions are preferably those hues having such colored hues as described before.

As in FIG. 2, the colored and non-colored portions in a pixel are shown as rectangularly arrayed ones obtained by isotropic division of the pixel into four portions or subpixels. However, no limitation is placed thereon so far as they are arranged as isotropically divided subpixels.

In this case, the colored portion and the non-colored portion are preferred to have an area ratio ranging from 1:1 to 1:7.

If the area of the colored portion is small (less than 12.5% of the total area of a pixel), vividness of color display is deteriorated. Accordingly, an appropriate contrast (shading ratio) between black/white display and color display is not obtained. On the other hand, if the area of the colored portion is large (not less than 50% of the total area of a pixel), brightness in white display becomes poor. Accordingly, an appropriate contrast (bright-dark ratio) between the white display and black display is not obtained.

Figure 3:
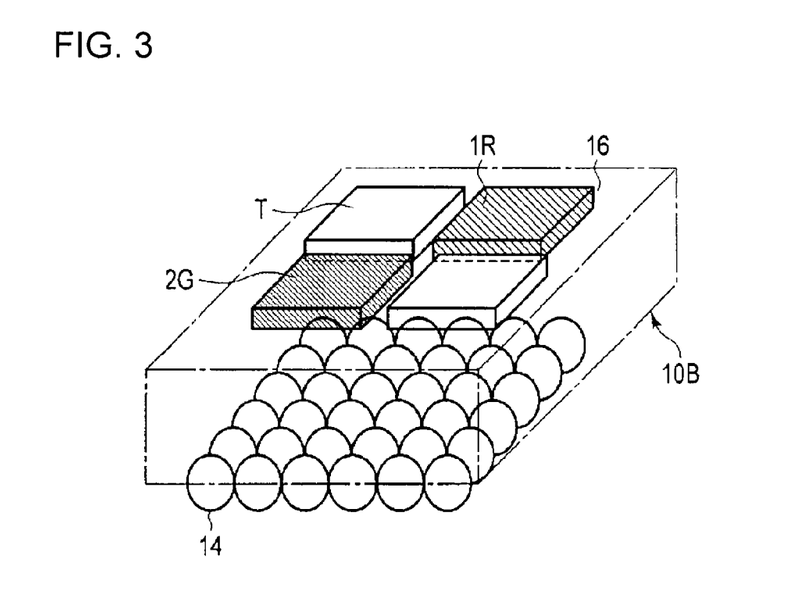
FIG. 3 is a perspective view illustrating an example of the state of another type of color display in an electrophoretic reflective color display related to an embodiment of the invention.

An electrophoretic reflective color display 10B shown in FIG. 3 includes an electrophoretic display layer 14 for black-and-white display, which is provided thereon with pixels each including, for example, a colored portion 1R having a red hue, a colored portion 2G having a green hue and non-colored portions (transparent portions) T.

In the electrophoretic reflective color display 10B, if all the portions corresponding to one pixel of the electrophoretic display layer 14 are displayed as white, the light rays transmitted through the colored portions 1R and 2G and the non-colored portion T are reflected, so that a mixed color is observed by an observer. If the hues of the respective colored portions satisfy the hues defined before, the colored portions 1R and 2G should be in a complementary relationship and thus the mixed color is displayed as white which is observed by an observer together with the light that has transmitted through the non-colored portion T. As a result, bright white display is obtained.

White display is similarly obtained when the portions corresponding to the colored portions 1R and 2G of the electrophoretic display layer 14 are used for black display. However, in this case, compared to the case of obtaining a white display by permitting all the portions corresponding to one pixel to be for white display, reflectance (brightness) becomes worse.

When a portion corresponding to the colored portion 1R alone of the electrophoretic display layer 14 is displayed as white, or when a portion corresponding to the colored portion 2G alone is displayed as black, red display that is similar to the hue possessed by the colored portion 1R can be obtained. When a portion corresponding to the colored portion 2G alone of the electrophoretic display layer 14 is displayed as white, or when a portion corresponding to the colored portion 1R alone is displayed as black, green display that is similar to the hue possessed by the colored portion 2G can be obtained.

When all the portions corresponding to one pixel of the electrophoretic display layer 14 are displayed as black, black display is possible. Especially, in this case, bright white display can be obtained, thereby realizing a reflective display which is capable of four-color display with an excellent black/white contrast (bright-dark ratio) in display.

With the case where the colored portion 1R or 2G does not satisfy the hue defined before, if all the portions corresponding to one pixel of the electrophoretic display layer 14 are displayed as white, the mixture of the color hues of the colored and non-colored portions is not displayed as white, but white display is realized which is effective only when the colored portion is displayed as black. Therefore, the resultant contrast (bright-dark ratio) of the black/white display is significantly lowered.

In the case where of the colored portions have having blue and yellow hues as well, as far as the hues of the colored portions, respectively, satisfy the above-defined hues, a reflective display is similarly realized, which is capable of four-color display with excellent black/white contrast (shading ratio) in black/white display.

The colored and non-colored portions arranged in one pixel are shown as rectangularly arrayed portions obtained by isotropic division into four subpixels as in FIG. 3, but not limited thereto, in so far as the array is one obtained by isotropic division. On this occasion, the area ratio of the colored portions occupied in an entire pixel is preferably not less than 25%. If the area ratio of the colored portions is small (less than 25% in terms of the area ratio of the colored portions), vividness in the respective color displays is lowered, and thus an appropriate contrast (shading ratio) is not obtained between black/white display and each color display.

The inks for forming the color filter related to the embodiments are formed by use of coloring materials, solvents, resins and dispersants.

The coloring materials of the inks used in the embodiments can include all types of pigments irrespective of whether they are organic pigments, inorganic pigments or dyes. Preferably, organic pigments are mentioned, especially, because of their excellence in light resistance. Specifically, the organic pigments used can include: C.I. Pigment Reds 9, 19, 38, 43, 97, 122, 123, 144, 149, 166, 168, 177, 179, 180, 192, 208, 215, 216, 217, 220, 223, 224, 226, 227, 228, 240 and 254; Pigment Blues 15, 15:6, 16, 22, 29, 60 and 64; C.I. Pigment Greens 7, 36 and 56; C.I. Pigment Yellows 20, 24, 86, 81, 83, 93, 108, 109, 110, 117, 125, 137, 138, 139, 147, 148, 150, 153, 154, 166, 168 and 185; C.I. Pigment Oranges 36 and 73; and C.I. Pigment Violet 23.

Further, in order to obtain desired hues, two or more of the materials may be mixed and used.

In the red pixel of the color filter related to the embodiments, a combination of PR177 and PR254 or a combination of PR177 and PR254 is preferred from the viewpoint of color characteristics, dispersibility, light resistance and the like.

In the green pixel of the color filter related to the embodiments, a combination of PG7 and PG36 or a combination of PG7, PG36 and PB15:3 is preferred from the viewpoint of color characteristics, dispersibility, light resistance and the like. In this case, a preferred weight percentage of PG7 or PG36 is 50 to 100%, and a preferred weight percentage of PB15:3 is 0 to 50%.

In the blue pixel of the color filter related to the embodiments, PB15:6 or a combination of PB15:6 and PV23 is preferred from the viewpoint of color characteristics, dispersibility, light resistance and the like. In this case, a preferred weight percentage of PB15:6 is 50 to 100% and a preferred weight percentage of PV23 is 0 to 50% in total pigments.

In the yellow pixel of the color filter related to the embodiments, PY150, PY138, or a combination of PY150, PY138 and PO73 is preferred from the viewpoint of color characteristics, dispersibility, light resistance and the like. In this case, a preferred weight percentage of PY150 and PY138 is 30 to 100%, and a preferred weight percentage of PO73 is 0 to 70%.

The solvents used for the inks related to the embodiments are preferably those which have a surface tension of not more than 35 mN/m and a boiling point of not less than 130° C., taking account of the adaptability to ink jet printing. A surface tension of not less than 35 mN/m causes significantly adverse effects on the stability of dot geometry in jetting the inks. A boiling point of not more than 130° C. significantly increases dryness in the vicinity of the nozzles, which may lead to a failure, such as nozzle clogging.

Specifically, the solvents used include 2-methoxyethanol, 2-ethoxyethanol, 2-butoxyethanol, 2-ethoxyethyl acetate, 2-buthoxyethyl acetate, 2-methoxyethyl acetate, 2-ethoxyethyl ether, 2-(2-ethoxyethoxy)ethanol, 2-(2-buthoxyethoxy)ethanol, 2-(2-ethoxyethoxy)ethyl acetate, 2-(2-buthoxyethoxy)ethyl acetate, 2-phenoxyethanol and diethylene glycol dimethyl ether. However, the solvents are not limited to these. Suitable solvents having the above properties are favorably used. As necessary, two or more solvents may be mixed and used.

The binder resins used in the embodiments include, for example, acrylic resins and novolac resins.

The acrylic resins as examples of the resins related to the embodiments include, but not limited to: polymers of monomers including alkyl(meth)acrylates, such as (meth)acrylic acid, methyl(meth)acrylate, ethyl(meth)acrylate, propyl (meth)acrylate, butyl(meth)acrylate, benzyl(meth)acrylate, lauryl(meth)acrylate, hydroxyethyl(meth)acrylate, hydroxypropyl(meth)acrylate, ethoxyethyl(meth)acrylate, and glycidyl(meth)acrylate; and alicyclic(meth)acrylates, such as cyclohexyl(meth)acrylate, isobornyl(meth)acrylate and dicyclopentenyl(meth)acrylate. These monomers may be used singly or in combination of two or more. Further, these acrylates may be copolymerized with copolymerizable compounds including styrene, cyclohexylmaleimide, phenylmaleimide, cyclohexylmaleimide, phenylmaleimide, methylmaleimide, ethylmaleimide, n-buthylmaleimide and laurylmaleimide.

The acrylic resins may be added with an ethylenically unsaturated group. The method of adding an ethylenically unsaturated group to acrylic resins includes, but not limited to, a method of adding a compound having an ethylenically unsaturated group and a carboxylic acid, such as acrylic acid, to a resin containing an epoxy group such as glycidyl methacrylate; a method of adding an epoxy-containing acrylate, such as glycidyl methacrylate, to a resin containing a carboxylic acid, such as methacrylic acid; or a method of adding an isocyanate group-containing acrylate, such as methacryloyloxyethyl isocyanate, to a hydroxyl group-containing resin, such as of hydroxymethacrylate.

The novolac resins used as an example of the resins related to the embodiments include phenolic novolac epoxy resins, or cresol novolac epoxy resins.

Preferably, the binder resins have a mass average molecular weight ranging from 500 to 10,000, more preferably from 500 to 8,000. If the mass average molecular weight of the binder resins exceeds 10,000, ink fluidity may be insufficient at the step of drying the colored portions and thus pattern flatness may be lowered. If the mass average molecular weight of a binder resin is less than 500, physical properties, such as solvent resistance and heat resistance, desired for the color filter are unlikely to be satisfied.

The dispersants for the coloring materials are used to improve the dispersibility of a pigment in a solvent. The dispersants used include, for example, ionic or non-ionic surfactants. Specifically, the dispersants include sodium alkylbenzene sulphonates, poly fatty acid salts, fatty acid salts, alkyl phosphates, tetra-alkyl ammonium salts and polyoxyethylene alkyl ethers. Dispersed materials may include organic pigment derivatives and polyesters. The dispersants may be used singly or in admixture of two or more as necessary.

The inks related to the embodiments are preferred to have a viscosity ranging from 1 to 20 mPa·s, more preferably from 5 to 15 mPa·s. If the viscosity of the coloring material exceeds 20 mPa·s, there may be a failure that the ink does not arrive at a predetermined position at the time of ink-jet ejection, or that the nozzles are clogged. On the other hand, if the viscosity of an ink is less than 1 mPa·s, the ink may be scattered during ink ejection.

The electrophoretic reflective color displays 10, 10A and 10b related to the embodiments described above are bright with a good color purity, enable the display of color hues and black and white display and also enable three- or four-color display.

The present embodiment may be variously modified and used within a range not departing from the spirit of the invention.

Specific examples of the present invention are described below.

EXAMPLES

Example 1

<Preparation of an Electrophoretic Display Layer>

A titanium oxide powder (white particles) coated with a polyethylene resin and having an average particle size of 3 μm and carbon black powder (black particles) subjected to surface treatment with alkyltrimethylammonium chloride and having an average particle size of 4 μm are dispersed in tetrachloroethylene to thereby obtain a dispersion. In this case, the white particles are negatively charged, while the black particles are positively charged.

The dispersion is O/W emulsified, and microcapsules are formed by a complex coacervation method using gelatin-gum arabic. Then, the dispersion is sealed in the microcapsules. The microcapsules obtained in this way are sifted so that the proportion of the microcapsules having a particle size of 50 to 70 μm, with their average particle size being 60 μm, are not less than 50% to thereby provide a uniform particle size of the microcapsules.

Next, an aqueous dispersion of the microcapsules having a solid content of 40 mass % is prepared. The aqueous dispersion, a urethane-based binder having a solid content of 25 mass % (CP-7050 manufactured by Dainippon Ink K.K.), a surfactant, a thickener and pure water are mixed to thereby prepare a coating solution for electrophoretic layer formation. The coating solution is coated onto a substrate 11 made such as, for example, of glass and having a surface on which pixel electrodes 12 made of ITO have been formed to thereby form the electrophoretic display layer 14.

On the electrophoretic display layer 14, a transparent electrode layer 15 made of ITO is formed. Thereafter, a polyester resin-based receptive solution (NS-141LX, manufactured by Takamatsu Oil and Fat Co., Ltd.) is continuously coated onto the transparent electrode layer 15 using a comma coater to thereby form a receptive layer having an average thickness of 10 μm.

<Preparation of a Pigment Dispersion>

Subsequently, coloring materials are prepared. For example, pigments shown in Table 1 are used as pigments for coloring, which are contained in the coloring materials used for making the color filter. Based on the formulations indicated in Table 1, the pigments are each well kneaded by means of beads mill dispersion to thereby prepare red, green, blue and yellow pigment dispersions.

TABLE 1

| Pigment Dispersion | Solvent | | Dispersant | | Pigment | |
|---|---|---|---|---|---|---|
| | Name of Substance | Added Amount (Parts by Weight) | Name of Product | Added Amount (Parts by Weight) | C.I. No. | Additive Amount (Parts by Weight) |
| RED | Propylene Glycol Monomethyl Ether Acetate | 70 | SOLSPERSE ® 20000 (Avecia) | 10 | C.I. Pigment Red 254 | 20 |
| GREEN | Propylene Glycol Monomethyl Ether Acetate | 70 | SOLSPERSE ® 20000 (Avecia) | 10 | C.I. Pigment Green 7 | 20 |
| BLUE | Propylene Glycol Monomethyl Ether Acetate | 70 | DISPERBYK ®-111 (BYK) | 10 | C.I. Pigment Blue 15:6 C.I. Pigment Violet 23 | 18 2 |
| YELLOW | Propylene Glycol Monomethyl Ether Acetate | 70 | SOLSPERSE ® 20000 (Avecia) | 10 | C.I. Pigment Yellow 150 | 20 |

<Preparation of Coloring Materials>

A binder resin and an organic solvent are added to the pigment dispersions prepared in this way and agitated well to thereby prepare six types of coloring materials (inks A to F) for the color filter as shown in Table 2

TABLE 2

| | Pigment Dispersion | | Binder Resin | | Solvent | |
|---|---|---|---|---|---|---|
| Pigment Dispersion | Name | Added Amount (Parts by Weight) | Name | Added Amount (Parts by Weight) | Name | Additive Amount (Parts by Weight) |
| Ink A | RED Dispersion | 20 | Acrylic Resin | 20 | Propylene Glycol Monomethyl Ether Acetate | 60 |
| Ink B | GREEN Dispersion | 20 | Acrylic Resin | 20 | Propylene Glycol Monomethyl Ether Acetate | 60 |
| Ink C | BLUE Dispersion | 20 | Acrylic Resin | 20 | Propylene Glycol Monomethyl Ether Acetate | 60 |
| Ink D | YELLOW Dispersion | 20 | Acrylic Resin | 20 | Propylene Glycol Monomethyl Ether Acetate | 60 |

<Formation of Color Filter Layer 16>

Subsequently, using an ink jet printer equipped with 12 pl, 180 dpi (180 dots per 2.54 cm) heads (manufactured by Seiko Instruments Inc.), ink A of the coloring material is coated onto the receptive layer formed on the electrophoretic display layer 14 at the given position of the respective pixels. Thereafter, drying of 80° C×5 min. is carried out using a hot air oven to thereby form a color filter layer 16 including colored portion R and non-colored portion T.

In order to check the hue by means of transmitted light for the colored portion R in each pixel, a similar coating procedure is carried out for the glass that serves as a substrate on which the receptive layer has been formed in advance, followed by color measurement using a spectrophotometer.

As a result, the color filter shown in Example 1 is obtained.

Finally, a protective film 17 is formed on the color filter layer 16 to thereby complete the electrophoretic reflective display.

Examples 2-6, Comparative Examples 1-4

Color filters of Examples 2-6 and Comparative Examples 1-4 are each obtained in the same manner as in Example 1 using combinations of inks and printing conditions indicated in Table 3.

The results shown in Table 3 reveal the following.

More specifically, in the cases where three-color display is possible with any one of RED, GREEN, BLUE and YELLOW hues shown in Examples 1-4 and black/white display and where the hues of the respective colored portions are such that chromaticity coordinate ($a^*$, $b^*$), measured with transmitted light using a D65 light source, in a chromaticity diagram of the $L^*a^*b^*$ color system satisfies the expressions of:

| RED: | $30 \leq a^* \leq 70$, | $-20 \leq b^* \leq 20$ |
|---|---|---|
| GREEN: | $-70 \leq a^* \leq -30$, | $-20 \leq b^* \leq 20$ |
| BLUE: | $-20 \leq a^* \leq 20$, | $-70 \leq b^* \leq -30$ |
| YELLOW: | $-20 \leq a^* \leq 20$, | $30 \leq b^* \leq 70$ | and the colored and non-colored portions are in a range of from 1:1 to 1:7, the black/white display and each color display (R, G, B, and Y) of the electrophoretic reflective display results in good brightness (reflectance) and color purity (chroma $c^*$) and good contrast in the black/white/color display.

Specifically, in the cases where four-color display is possible with RED and GREEN hues or BLUE and YELLOW hues and black/white display shown in Examples 5 and 6 and where the hues of the respective colored portions are such that chromaticity coordinate ($a^*$, $b^*$), measured with transmitted light using a D65 light source, in a chromaticity diagram of the $L^*a^*b^*$ color system satisfies the expressions of:

| RED: | $30 \leq a^* \leq 70$, | $-20 \leq b^* \leq 20$ |
|---|---|---|
| GREEN: | $-70 \leq a^* \leq -30$, | $-20 \leq b^* \leq 20$ |
| BLUE: | $-20 \leq a^* \leq 20$, | $-70 \leq b^* \leq -30$ |
| YELLOW: | $-20 \leq a^* \leq 20$, | $30 \leq b^* \leq 70$ | and the area ratio of the colored portions in each pixel is not less than 25%, the black/white display and the respective color displays (R, G, B, and Y) of the electrophoretic reflective display results in good brightness (reflectance) and color purity (chroma $c^*$) and good contrast in the black/white/color display.

In other Comparative Examples 1-4, when the black/white display and color display (R, G, B, Y) are performed in the electrophoretic reflective display, the brightness (reflectance) and color purity (chroma $c^*$) are unsatisfactory and no good contrast in black/white/color display is obtained.

TABLE 3

| | | | Area of Colored | Chromaticity of Transmitted Light | | White Display | Black Display | Color Display (1) | | Color Display (2) | |
|---|---|---|---|---|---|---|---|---|---|---|---|
| | | Display | | | | | | Reflectance | Chroma | Reflectance | Chroma |
| | Ink | Color | Layer (%) | $a^*$ | $b^*$ | | | (%) | ($c^*$) | (%) | ($c^*$) |
| Example 1 | A | RED | 25 | 53 | 15 | 29 | 3.0 | 36.7 | 11.5 | 4.4 | 10.7 |
| Example 2 | B | GREEN | 25 | −58 | 5 | 31 | 3.2 | 37.6 | 20.5 | 6.5 | 19.2 |
| Example 3 | C | BLUE | 25 | −5 | −56 | 27 | 2.8 | 35.2 | 13.1 | 4.2 | 11.4 |

TABLE 3-continued

| | Ink | Display Color | Area of Colored Layer (%) | Chromaticity of Transmitted Light a* | Chromaticity of Transmitted Light b* | Reflectance (%) White Display | Reflectance (%) Black Display | Color Display (1) Reflectance (%) | Color Display (1) Chroma (c*) | Color Display (2) Reflectance (%) | Color Display (2) Chroma (c*) |
|---|---|---|---|---|---|---|---|---|---|---|---|
| Example 4 | D | YELLOW | 25 | −10 | 51 | 32 | 3.3 | 38.0 | 10.0 | 6.8 | 9.2 |
| Example 5 | A | RED | 40 | 53 | 15 | 35 | 2.1 | 21.2 | 8.7 | 5.1 | 14.2 |
| | B | GREEN | | −58 | 5 | | | 23.5 | 10.1 | 6.3 | 13.7 |
| Example 6 | C | BLUE | 40 | −5 | −56 | 33 | 2.2 | 22.2 | 8.2 | 5.5 | 12.5 |
| | D | YELLOW | | −10 | 51 | | | 25.1 | 7.0 | 7.3 | 9.4 |
| Comparative Example 1 | A | RED | 25 | 25 | 1 | 35 | 2.9 | 39.5 | 3.0 | 5.8 | 2.8 |
| Comparative Example 2 | A | RED | 25 | 75 | 37 | 27 | 2.2 | 29.5 | 12.0 | 4.0 | 11.2 |
| Comparative Example 3 | A | RED | 10 | 53 | 15 | 34 | 3.0 | 40.1 | 3.1 | 6.0 | 2.8 |
| Comparative Example 4 | A | RED | 70 | 53 | 15 | 12 | 2.8 | 23.1 | 22.3 | 3.9 | 21.1 |
| No Color Filter Layer | — | — | — | — | — | 45 | 3.4 | — | — | — | — |

As a display device that imposes a small burden on eyes, there may be an electrophoretic reflective display panel, i.e. electronic paper, which includes an electrophoretic display layer between a pair of electrodes. Similar to printed paper, this electrophoretic display panel displays characters and images by means of reflected light and thus imposes only a small burden on eyes and is suitable for work in which one continues to watch the screen over a long time.

The electrophoretic display panels are predominantly directed to two-color display, which is primarily based on black and white, in view of the structure thereof. In this connection, however, there may be a display device wherein a color filter constituted of pixels of three primary colors of red, green and blue is provided on an electrophoretic display layer to enable multicolored display.

Reflective displays, typical of which are the electrophoretic display panels, utilize outside light for display and thus limitation is placed on the luminance (brightness) of the panel. In the case of multicolor display enabled by a color filter in which each of the pixels has colored portions of the three primary colors of red, green and blue, the luminance may lower due to the color filter.

In the case of realizing multicolor display, display of three colors in total consisting of black and white plus one color is sufficient for some applications, instead of full-color display. In this case, a colored portion and a non-colored portion (transparent portion) may be arranged in each of pixels to enhance the luminance (brightness) of the panel. However, when the colored portion and the non-colored portion (transparent portion) are arranged in each of pixels, a mixed color consisting of the hue of the colored portion and the hues (black/white hues) of the non-colored portion may be observed by an observer. Therefore, the color purity (vividness) is likely to lower from the hue possessed by the colored portion.

One aspect of the present invention is to provide a reflective color display that enables bright and vivid color display.

In one embodiment, a reflective color display is formed by stacking, on a substrate, an electrophoretic display layer, a light-transmissive electrode layer and a color filter layer in this order. The color filter layer includes pixels located on the light-transmissive electrode layer, the pixels each including a colored portion and a non-colored portion.

In a first embodiment, a hue of a colored portion includes a red hue defined such that chromaticity coordinates (a*, b*), measured with transmitted light using a D65 light source, in a chromaticity diagram of the $L^*a^*b^*$ color system satisfy the expressions of "$30 \leq a^* \leq 70$" and "$-20 \leq b^* \leq 20$".

In a second embodiment, a hue of a colored portion includes a green hue defined such that chromaticity coordinates (a*, b*), measured with transmitted light using a D65 light source, in a chromaticity diagram of the $L^*a^*b^*$ color system satisfy the expressions of "$-70 \leq a^* \leq -30$" and "$-20 \leq b^* \leq 20$".

In a third embodiment, hues of colored portions, respectively, include a red hue defined such that chromaticity coordinates (a*, b*), measured with transmitted light using a D65 light source, in a chromaticity diagram of the $L^*a^*b^*$ color system satisfy the expressions of "$30 \leq a^* \leq 70$" and "$-20 \leq b^* \leq 20$", and a green hue defined such that chromaticity coordinates (a*, b*), measured with transmitted light using a D65 light source, in a chromaticity diagram of the $L^*a^*b^*$ color system satisfy the expressions of "$-70 \leq a^* \leq -30$" and "$-20 \leq b^* \leq 20$".

In a fourth embodiment, a hue of a colored portion includes a blue hue defined such that chromaticity coordinates (a*, b*), measured with transmitted light using a D65 light source, in a chromaticity diagram of the $L^*a^*b^*$ color system satisfy the expressions of "$-20 \leq a^* \leq 20$" and "$-70 \leq b^* \leq -30$".

In a fifth embodiment, a hue of a colored portion includes a yellow defined such that chromaticity coordinates (a*, b*), measured with transmitted light using a D65 light source, in a chromaticity diagram of the $L^*a^*b^*$ color system satisfy the expressions of "$-20 \leq a^* \leq 20$" and "$30 \leq b^* \leq 70$".

In a sixth embodiment, hues of colored portions include a blue hue defined such that chromaticity coordinates (a*, b*), measured with transmitted light using a D65 light source, in a chromaticity diagram of the $L^*a^*b^*$ color system satisfy the expressions of "$-20 \leq a^* \leq 20$" and "$-70 \leq b^* \leq -30$", and a yellow hue defined such that chromaticity coordinates (a*, b*), measured with transmitted light using a D65 light source, in a chromaticity diagram of the $L^*a^*b^*$ color system satisfy the expressions of "$-20 \leq a^* \leq 20$" and "$30 \leq b^* \leq 70$".

In a seventh embodiment, the reflective color display according to any of the first, second, fourth and fifth embodiments is preferred to have pixels in each of which an area ratio of the colored portion and the non-colored portion ranges from 1:1 to 1:7.

In an eighth embodiment, the reflective color display according to the third or sixth embodiment is preferred to have pixels in each of which an area of the colored portion is not less than 25%.

The embodiments of the present invention can provide a reflective color display that enables bright and vivid color display by means of display colors realized by a colored portion or portions having a colored hue and a non-colored portion or portions.

The invention claimed is:

1. A reflective color display, comprising:
 a substrate;
 an electrophoretic display layer formed on the substrate;
 a light transmissive electrode layer formed on the electrophoretic display layer; and
 a color filter layer formed on the light transmissive electrode layer and including at least one colored portion and a non-colored portion in a pixel located on the light transmissive electrode layer,
 wherein the colored portion has a green hue defined by a chromaticity coordinate ($a^*$, $b^*$) in a chromaticity diagram of the $L^*a^*b^*$ color system satisfying $-70 \leq a^* \leq -30$ and $-20 \leq b^* \leq 20$, where the chromaticity coordinate is measured with transmitted light using a D65 light source.

2. The reflective color display of claim 1, wherein the colored portion and the non-colored portion in the pixel have an area ratio ranging from 1:1 to 1:7.

3. The reflective color display of claim 1, wherein the colored portion has an area of not less than 25% in the pixel.

4. A reflective color display, comprising:
 a substrate;
 an electrophoretic display layer formed on the substrate;
 a light transmissive electrode layer formed on the electrophoretic display layer; and
 a color filter layer formed on the light transmissive electrode layer and including at least one colored portion and a non-colored portion in a pixel located on the light transmissive electrode layer,
 wherein the colored portion has a yellow hue defined by a chromaticity coordinate ($a^*$, $b^*$) in a chromaticity diagram of the $L^*a^*b^*$ color system satisfying $-20 \leq a^* \leq 20$ and $30 \leq b^* \leq 70$, where the chromaticity coordinate is measured with transmitted light using a D65 light source.

5. The reflective color display of claim 4, wherein the colored portion and the non-colored portion in the pixel have an area ratio ranging from 1:1 to 1:7.

6. The reflective color display of claim 5, further comprising:
 a plurality of pixel electrodes formed on the substrate; and
 an adhesive layer formed on the pixel electrodes,
 wherein the electrophoretic display layer is formed on the adhesive layer.

7. The reflective color display of claim 6, wherein the electrophoretic display layer comprises a plurality of microcapsules and a binder resin fixing the microcapsules therein.

8. The reflective color display of claim 4, wherein the colored portion has an area of not less than 25% in the pixel.

9. A reflective color display, comprising:
 a substrate;
 an electrophoretic display layer formed on the substrate;
 a light transmissive electrode layer formed on the electrophoretic display layer; and
 a color filter layer formed on the light transmissive electrode layer and including at least one colored portion and a non-colored portion in a pixel located on the light transmissive electrode layer,
 wherein the colored portion is provided in a plurality and comprises a first colored portion and a second colored portion, the first colored portion has a red hue defined by a chromaticity coordinate ($a^*$, $b^*$) in a chromaticity diagram of the $L^*a^*b^*$ color system satisfying $30 \leq a^* \leq 70$ and $-20 \leq b^* \leq 20$, and the second colored portion has a green hue defined by the chromaticity coordinate satisfying $-70 \leq a^* \leq -30$ and $-20 \leq b^* \leq 20$, where the chromaticity coordinate is measured with transmitted light using a D65 light source.

10. The reflective color display of claim 9, wherein the first colored portion and the second colored portion each have an area of not less than 25% in the pixel.

11. The reflective color display of claim 9, wherein the first colored portion and the second colored portion have a total area of not less than 40% in the pixel.

12. The reflective color display of claim 9, wherein the first colored portion and the second colored portion have a total area of 40-50% in the pixel.

13. The reflective color display of claim 12, further comprising:
 a plurality of pixel electrodes formed on the substrate; and
 an adhesive layer formed on the pixel electrodes,
 wherein the electrophoretic display layer is formed on the adhesive layer.

14. The reflective color display of claim 13, wherein the electrophoretic display layer comprises a plurality of microcapsules and a binder resin fixing the microcapsules therein.

15. A reflective color display, comprising:
 a substrate;
 an electrophoretic display layer formed on the substrate;
 a light transmissive electrode layer formed on the electrophoretic display layer; and
 a color filter layer formed on the light transmissive electrode layer and including at least one colored portion and a non-colored portion in a pixel located on the light transmissive electrode layer,
 wherein the colored portion is provided in a plurality and comprises a third colored portion and a fourth colored portion, the third colored portion has a blue hue defined by a chromaticity coordinate ($a^*$, $b^*$) in a chromaticity diagram of the $L^*a^*b^*$ color system satisfying $-20 \leq a^* \leq 20$ and $-70 \leq b^* \leq -30$, and the fourth colored portion has a yellow hue defined by the chromaticity coordinate satisfying $-20 \leq a^* \leq 20$ and $30 \leq b^* \leq 70$, where the chromaticity coordinate is measured with transmitted light using a D65 light source.

16. The reflective color display of claim 15, wherein the third colored portion and the fourth colored portion each have an area of not less than 25% in the pixel.

17. The reflective color display of claim 15, wherein the third colored portion and the fourth colored portion have a total area of not less than 40% in the pixel.

18. The reflective color display of claim 15, wherein the third colored portion and the fourth colored portion have a total area of 40-50% in the pixel.

19. The reflective color display of claim 18, further comprising:
 a plurality of pixel electrodes formed on the substrate; and
 an adhesive layer formed on the pixel electrodes,
 wherein the electrophoretic display layer is formed on the adhesive layer.

20. The reflective color display of claim 19, wherein the electrophoretic display layer comprises a plurality of microcapsules and a binder resin fixing the microcapsules therein.

* * * * *